United States Patent
Roux

(10) Patent No.: US 10,165,761 B1
(45) Date of Patent: Jan. 1, 2019

(54) MULTILEVEL CAGE FOR TRANSPORTING AND STUNNING LIVE POULTRY

(71) Applicant: Francois Roux, Nacogdoches, TX (US)

(72) Inventor: Francois Roux, Nacogdoches, TX (US)

(73) Assignee: Bright Coop, Inc., Nacogdoches, TX (US)

( * ) Notice: Subject to any disclaimer, the term of this patent is extended or adjusted under 35 U.S.C. 154(b) by 712 days.

(21) Appl. No.: 13/999,671

(22) Filed: Mar. 17, 2014

Related U.S. Application Data

(60) Provisional application No. 61/852,704, filed on Mar. 19, 2013.

(51) Int. Cl.
*A01K 45/00* (2006.01)
*A22B 3/00* (2006.01)

(52) U.S. Cl.
CPC .............. *A01K 45/005* (2013.01); *A22B 3/00* (2013.01)

(58) Field of Classification Search
CPC .............................. A01K 45/00; A01K 45/005
USPC ....... 119/453, 496, 497, 481, 501, 843, 844, 119/452, 455, 400, 412–415; 452/52, 53, 452/57
See application file for complete search history.

(56) References Cited

U.S. PATENT DOCUMENTS

| | | | | |
|---|---|---|---|---|
| 3,990,400 A | * | 11/1976 | Shreckhise | A01K 31/002 119/494 |
| 4,285,299 A | * | 8/1981 | Thomas | A01K 45/005 119/453 |
| 5,913,286 A | * | 6/1999 | Showalter | A01K 45/005 119/843 |
| 6,109,215 A | * | 8/2000 | Jerome | A01K 45/005 119/843 |
| 6,612,918 B2 | * | 9/2003 | Livingston | A01K 45/005 119/846 |
| 6,694,918 B2 | * | 2/2004 | Draft | A01K 31/002 119/400 |
| 7,389,145 B2 | * | 6/2008 | Kilgore | A61N 1/32 607/46 |
| 8,176,879 B1 | * | 5/2012 | Anderson | A01K 45/005 119/846 |

* cited by examiner

*Primary Examiner* — Richard R Price, Jr.
(74) *Attorney, Agent, or Firm* — Robert E. Wise

(57) ABSTRACT

Poultry birds in a multi-compartment cage can be removed by placing openings to each compartment on a first side of the cage, and covering each opening, with a spring-loaded door wherein the spring loading is provided by an over-center spring. During transport of the birds in the cage compartment, the spring loading of each door is sufficient to prevent any bird from exiting the cage. At the delivery point, the entire cage can be tilted to the side of the openings at an angle sufficient to cause the birds to slide against and open the spring-loaded door beyond the spring's center, thereby causing the door to completely open. After the birds have slid out of the cage, the doors can be closed. Poultry birds are loaded into the cage compartments via a second door in each compartment, and each second door is disposed on a second side of the cage.

2 Claims, 8 Drawing Sheets

MULTILEVEL CAGE FOR TRANSPORTING AND STUNNING LIVE POULTRY

(B) CROSS-REFERENCE TO RELATED APPLICATIONS

This application claims the benefit of 35 U.S.C. 111(b) provisional application Ser. No. 61/852,704 filed on Mar. 19, 2013, entitled "Multilevel Cage for Transporting and Stunning Live Poultry".

(C) STATEMENT REGARDING FEDERALLY SPONSORED RESEARCH OR DEVELOPMENT

Not applicable.

(D) THE NAMES OF THE PARTIES TO A JOINT RESEARCH AGREEMENT

Not applicable.

(E) INCORPORATION-BY-REFERENCE OF MATERIAL SUBMITTED ON A COMPACT DISC

Not applicable

(F) BACKGROUND OF THE INVENTION (1) Field of the Invention

This invention relates to the field of cages which hold poultry for transport from poultry growing locations to poultry processing locations. This invention also relates to the field of unloading poultry from cages.

(2) Description of Related Art

The poultry food industry has sought to streamline and mechanize the growing, transport, and processing of poultry for the consumer. At each stage of the process, the emphasis has been on reducing human contact with the poultry and on increasing mechanization.

Heavy poultry birds are typically grown in rural locations in large enclosures specially designed for large numbers of birds. When the poultry birds are ready to be slaughtered and processed into food, specially designed equipment gathers the birds within the enclosures and moves them to cages on a transport vehicle. The birds are then transported within the cage on the transport vehicle to the processing factory. At the processing factory, the poultry birds are removed from the cages and hung by their legs on a conveyor system for slaughtering and processing. The birds are alive throughout this process.

The cages used to transport the poultry birds from the rural locations to the processing plant are typically open cages with one or more compartments accessed by a cage door that slides up. Some cages have two or more levels of compartments with each compartment being accessible by a single door. Some multi-level cages may be arranged with two side-by-side vertical columns of compartments within a single cage.

Once the birds reach the processing plant, it is necessary to take the birds out of the cage compartments and hang them on the processing plant's conveyor system. The birds usually do not exit the cage compartments willingly and it is usually necessary for persons to open each cage compartment's door and grasp each bird and pull it out of the cage compartment. Poultry birds will sometimes resist this process and may even peck at the persons' arms and hands. It is an altogether slow, difficult, and labor-intensive process. It is difficult for processing plants to find people who are willing to do this job. Even with good workers, it can take several minutes to remove all the poultry birds from a multi-compartment cage. Further, when cages have multiple levels, the workers must stoop, down in uncomfortable positions to reach birds in the lower levels and may have to stand on a stool or ladder to reach birds in the upper levels.

It would be desirable to provide a cage that facilitates the rapid removal of poultry birds from within the cage. Yet, even though the industry is decades old, no economical solution has been found to unload live or stunned heavy birds.

(G) BRIEF SUMMARY OF THE INVENTION

My invention is a novel cage structure that enables heavy poultry bird cages to be loaded in the normal manner and then to be unloaded in a rapid manner with little or no human effort. I realized that the cages need not use the same door for loading and unloading the birds. Rather, each cage compartment could have a separate door for loading the birds into the cage compartment, and a separate door for unloading the birds from the cage. Further, I realized that it would be possible to arrange the unloading door of each compartment such that it would securely hold the birds within the cage compartment during transport, and would open easily for rapid unloading of the poultry birds at the proper time. My solution of the problem is to provide an unloading door that is spring-loaded (also termed spring-biased).

I also realized that my spring-loaded door could be disposed in each cage compartment such that all spring-loaded doors are disposed on one side of the entire cage structure. This will enable the near-simultaneous unloading of all heavy birds in each cage compartment merely by tipping the cage structure to that side and allowing gravity to cause the poultry birds to slide out of the spring-loaded door. I realized that the spring-loading of the door could be made sufficiently strong that the door would not open during transport, even if one or more birds fell against the door during the normal swaying and bouncing of the transport vehicle or even if the bed of the transport vehicles trailer were to tilt somewhat on a roadway that was not level. Yet, when desired, the entire cage structure could be tilted sufficiently by any mechanical means such that the weight of the poultry birds inside each cage compartment would cause the spring-loaded doors to open and allow the birds to slide completely out of the compartment by gravity. No human contact with the birds would be necessary. Humans would not even need to open the multiple doors of the cage structure. The weight of the birds pressing against the door when the cage structure is tilted would suffice to open the doors and allow the birds to exit the cage under their own weight. The cages should be placed on the trailer of a transport vehicle in a manner such that the spring-loaded doors will be toward the front of the trailer, in order to keep the wind sweeping back over the trailer during travel from opening the doors.

I also realized that it would be desirable for the spring-loaded doors to utilize an over-center spring mechanism. In a normal spring-loaded door, the spring will bias the door shut unless a sufficient force opens the door. When the force opening the door ceases, the spring will then urge the door to close. A normally spring-loaded door would suffice to allow multiple birds to exit the cage since their combined weight would be enough to overcome the spring biasing when they collectively press against the door. But, if one or a small number of birds remained within the compartment, the weight of one or a small number of birds might not be sufficient to cause the normally spring-loaded door to open. Then a human would have to reach in to grasp and remove the single bird or small number of birds. If an over-center spring mechanism is employed, the door will completely open when the cage structure is tilted and several birds press against the door. Once open, the door will remain open so that all birds can fully exit the cage compartments. If necessary, the cage structure can be tilted further than normal to facilitate the removal of all birds from all compartments. It would then be easy for an operator or a mechanized system to close all cage doors. The provision of an over-center spring-loading of the exit doors of a cage structure solves the problem of one or a small number of birds remaining within one or more cage compartments when the cage structure is tilted in a normal manner.

I also realized that it would be desirable to provide a double-door system at the exit. It is possible to have only a single-door system at each cage exit location, but a double-door system would be advantageous. My double-door system has an over-center spring-loaded door along the bottom of each cage compartment at the exit side. There is also an independent cooperating door along the top of each cage compartment at the exit side. The spring-loaded door and the independent door cooperate with each other to cover and enclose the opening of the cage compartment where it is intended that the poultry birds will exit the compartment. There are many potential orientations and versions that will be apparent to a person of ordinary skill who is reading this disclosure, all of which would fall within the scope of this disclosure. But I have found that the optimum version of a double-door spring-loaded door system for a cage compartment to have a free-swinging top door that is not spring-loaded and a spring-loaded bottom door. The top door is hinged along the top of the opening to that door's cage compartment, and each bottom door is hinged along the bottom of that door's cage compartment. Each of the two doors is somewhat larger than the opening of the particular cage compartment so that, when the doors are cooperatively closed, the two doors of each double-door system overlap somewhat along the middle of the compartment opening and fully enclose that opening. In operation, it is desirable that the spring-loaded bottom door overlap the non-spring-loaded door to the outside, such that the bottom portion of the top non-spring-loaded door is held closed by the top portion of the bottom spring-loaded door.

(H) BRIEF DESCRIPTION OF THE SEVERAL VIEWS OF THE DRAWINGS

(I) DETAILED DESCRIPTION OF THE INVENTION

Figure 1:
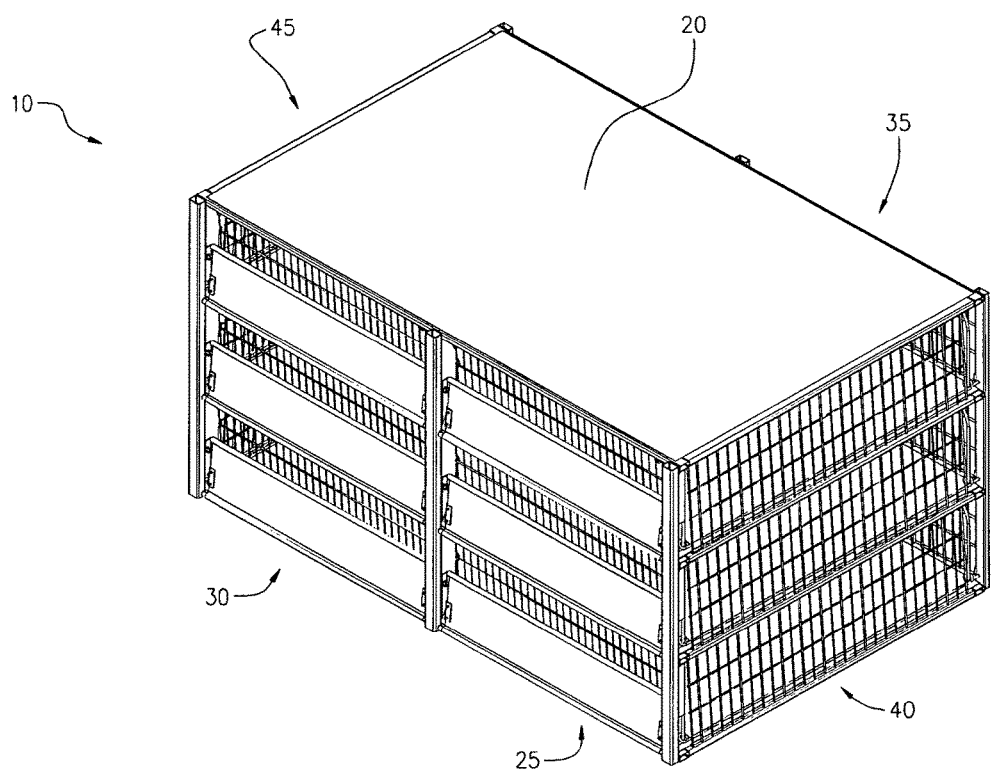
FIG. 1 is an isometric view of a cage structure according to a preferred embodiment of this invention.

The preferred embodiment of my invention is illustrated in the drawing figures that accompany this disclosure. This preferred embodiment will be sized and adapted to contain and transport live turkeys. However, other possible embodiments of this invention could be sized and adapted to contain and transport other types of live poultry birds, such as chicken or ducks.

A cage structure 10 utilizing my invention is shown in FIG. 1. This unitary cage structure 10 has two columns of compartments, with each column having three levels of cages. Thus, the cage structure shown in FIG. 1 can have three separate enclosed compartments within the cage structure, one on each level, or alternatively, if there is a central vertical wall 60 extending though each level, there could be six separate enclosed compartments within the cage structure. In the isometric view of FIG. 1, the cage structure has a top 20, a first side 30, and an end 40. Although not clearly visible in the isometric view of FIG. 1, the cage structure also has a bottom 25 opposite the top 20, a second side 35 opposite the first side 30, and a second end 45 opposite the first end 40. Therefore, the top 20 and bottom 25, the first side 30 and the second side 35, and the first end 40 and the second end 45 all generally define a rectangular prism.

Figure 2:
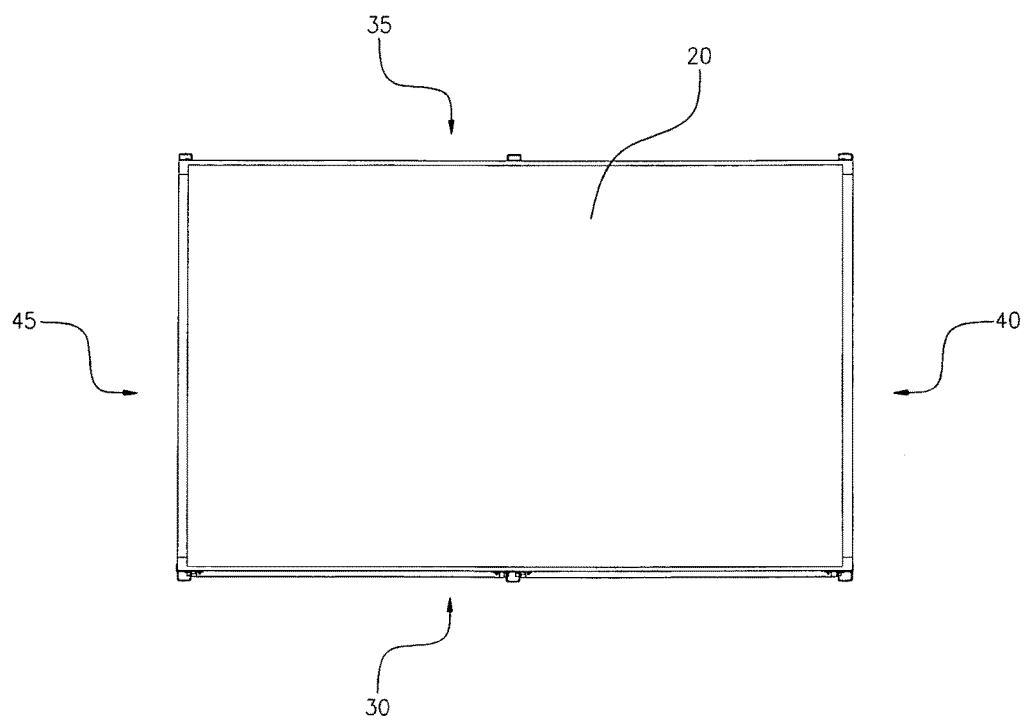
FIG. 2 is a top view of the cage structure of FIG. 1.
Figure 3:
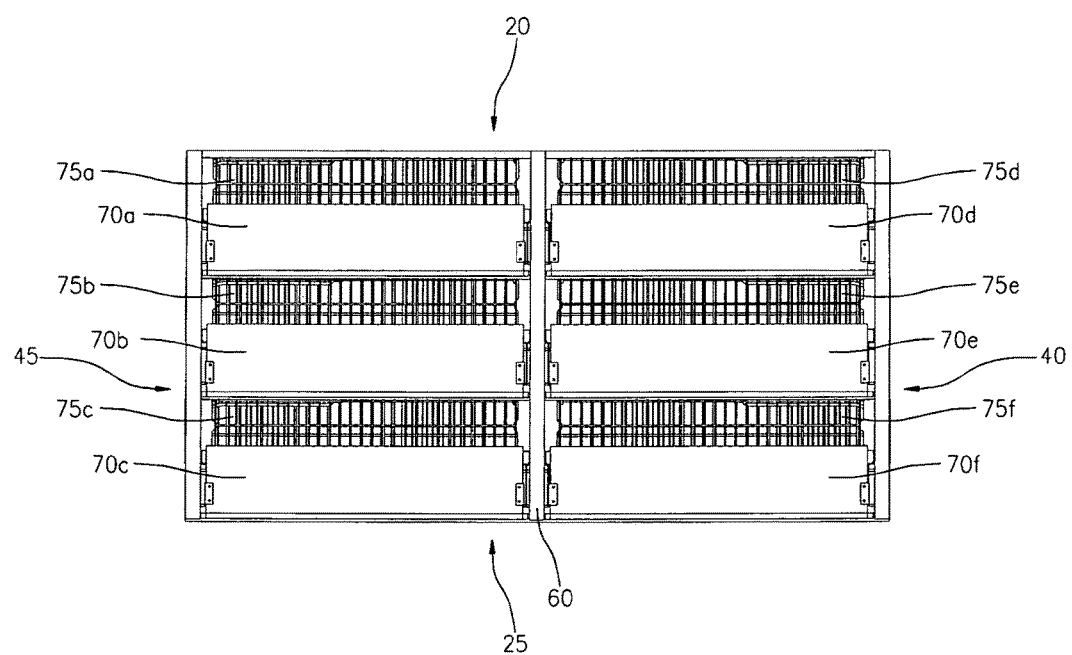
FIG. 3 is a side view of the cage structure of FIG. 1.
Figure 4:
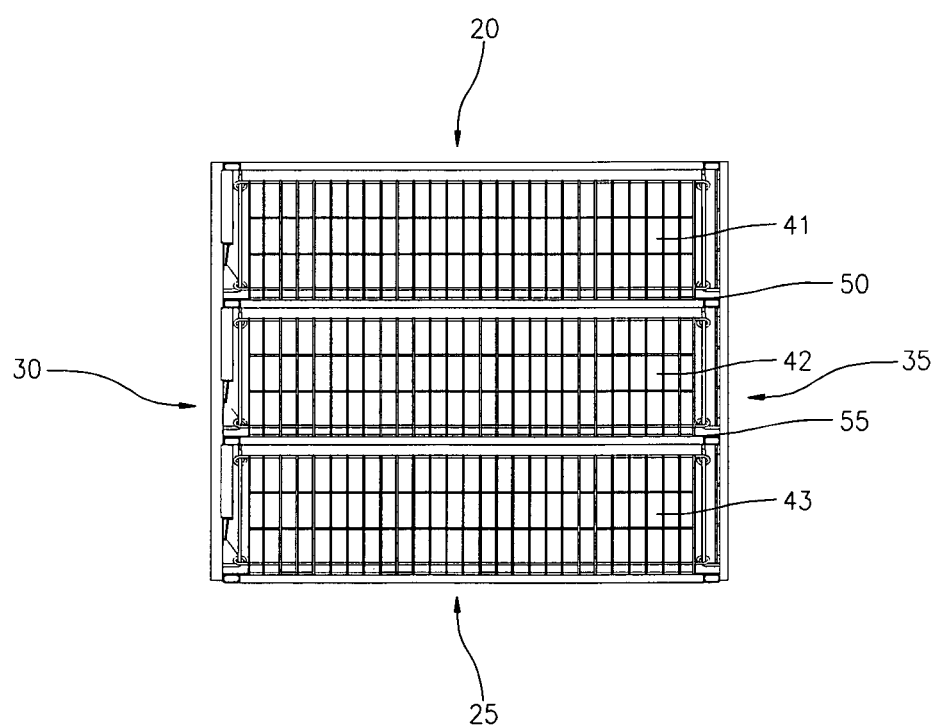
FIG. 4 is an end view of the cage structure of FIG. 1.

FIG. 2 shows the top 20 of the cage structure. FIG. 3 shows the first side 30 of the cage structure. FIG. 4 shows the first end 40 of the cage structure. There are two intermediate horizontal floors 50 and 55, and a vertical wall 60 disposed within the cage structure. As is apparent from FIG. 3, that the various structures enumerated above define six separate cage compartments, being situated in two columns and three vertical levels. My invention can be applied equally well to any cage structure regardless of the number of cage compartments it might have. The preferred embodiment can have a vertical wall 60 which means there are two separate compartments on each level, with one door for each compartment. Alternatively, the vertical wall 60 can be omitted which means there will be one compartment on each level, with two separate doors for each compartment. But I choose to illustrate the preferred embodiment of this invention using the six-compartment cage structure shown in FIGS. 1-4.

In the preferred embodiment of FIGS. 1-4, each of the six cage compartments has one door (hereinafter termed "entry doors") that will be used primarily for loading poultry birds into that compartment, and one door (hereinafter termed "exit doors") that will be used primarily for unloading poultry birds from that compartment. The six entry doors are disposed on the two ends 40 and 45 of the cage structure. Specifically, entry doors 41, 42, and 43 are disposed on end 40; and entry doors 46, 47, and 48 (not shown) are disposed on end 45 of the cage structure 10. Each of the entry doors 41-43 and 46-48 are rod-guided and disposed as is well known in this art. Each of the entry doors 41-43 and 46-48 are capable of. being securely closed and latched to contain poultry birds within their respective cage compartment. To load birds into the cage structure, a person may typically open each individual entry door 41-43 and 46-48 by sliding the door upwards on its rod guide. The person would might grasp and place individual poultry birds within each of the six compartments. Alternatively, birds might arrive at the entry doors from a conveyor apparatus (not shown) and move into the cage compartments with little or no help from humans Once a cage compartment has been filled with poultry birds, a human will manually close and latch each of the entry doors 41-43 and 46-48. The birds are now contained within the six compartments of the cage structure.

In the preferred embodiment of FIGS. 1-4, each of the six cage compartments has one exit door. All six exit doors of the cage structure 10 are disposed on the first side 30 of the cage structure. The reason all six doors are disposed on only one side (and either side could be selected) is that the cage structure 10 can be completely emptied of poultry birds by tilting the cage structure 10 to one side, that side being side 30. The weight of the poultry birds within each cage compartment will then force the spring-loaded exit doors open and the birds will exit the compartment by gravity. If the exit doors were disposed on both sides 30 and 35, it would be necessary to tilt the cage structure 10 in two directions. With the exit doors disposed only on one side, all birds can be unloaded by tilting the cage structure 10 only to one side.

Each of the six cage compartments has one exit double-door as can be seen clearly in FIG. 3. Each exit double-door has a lower spring-loaded door 70 and an upper non-spring-loaded door 75. The spring-loaded doors for the six compartments are designated 70a, 70b, 70c, 70d, 70e, and 70f in FIG. 3. Each of these spring-loaded doors 75 is individually hinged at the bottom of the door 75, or at each side toward the bottom, so that the door opens downwardly when a sufficient force is applied to the door. The non-spring-loaded doors for the six compartments are designated 75a, 75b, 75c, 75d, 75e, and 75f. The non-spring-loaded doors are each individually hinged at the top thereof, or at both sides near the top, such that the door opens upwardly. The manner in which the doors 70 and 75 are hinged is not critical and many different hinging mechanisms will work well. Since the doors 75 are not spring-loaded, they will tend to hang downwardly due to gravity. Whenever the cage structure 10 is tilted to the first side 30, the doors will tend to swing such that they remain vertical to the ground due to gravity. However, if the spring-loaded doors 70 have not been opened and overlap the non-spring-loaded doors 75, they will tend to keep the non-spring-loaded doors 75 completely closed even when the cage structure 10 is tilted.

Figure 5:
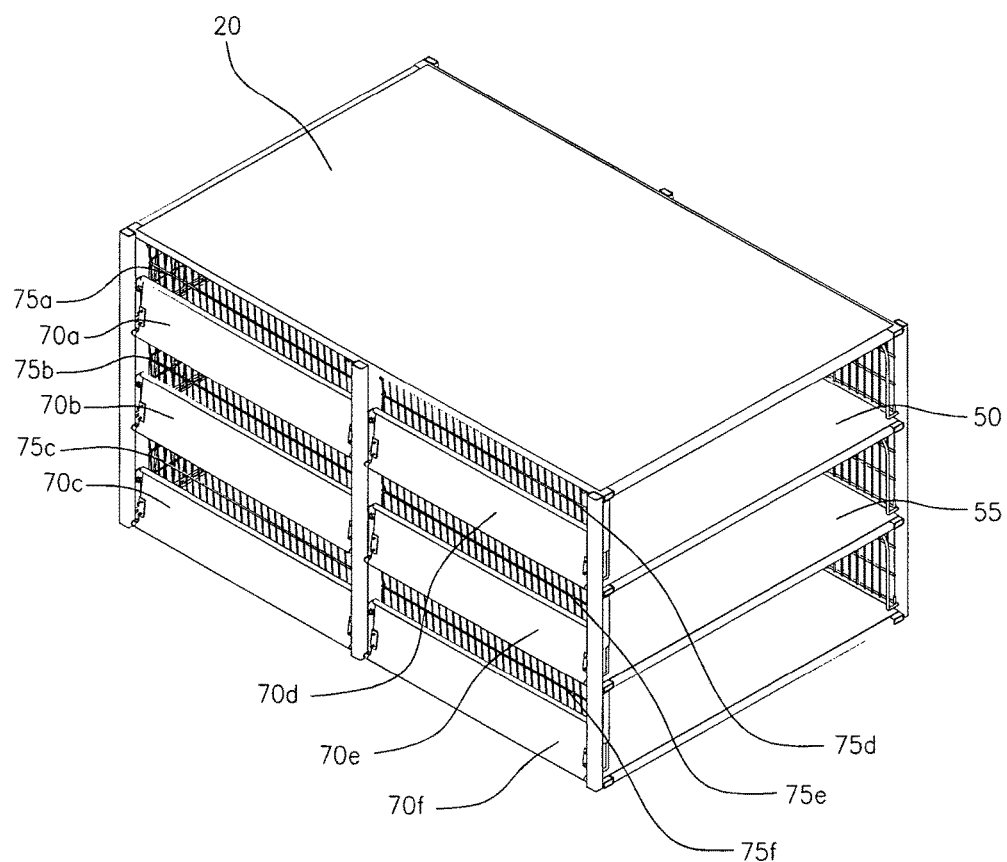
FIG. 5 is an isometric view of the cage structure of FIG. 1 shown in a loading mode.
Figure 6:
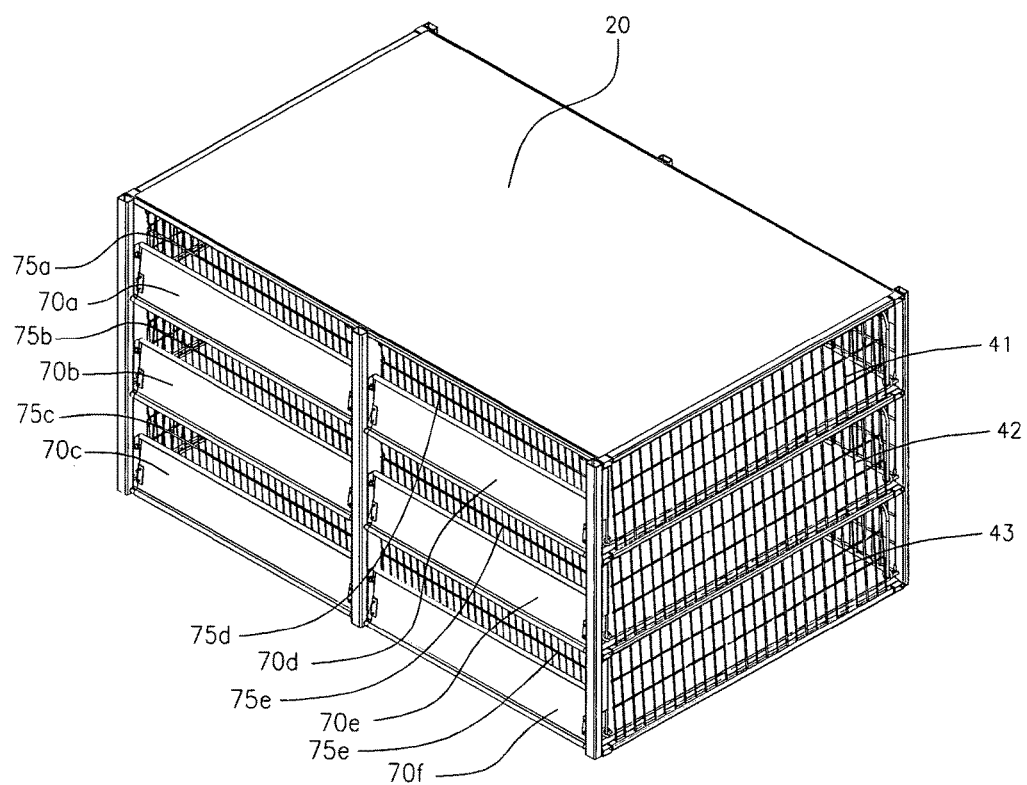
FIG. 6 is an isometric view of the cage structure of FIG. 1 shown in a transport mode.
Figure 7:
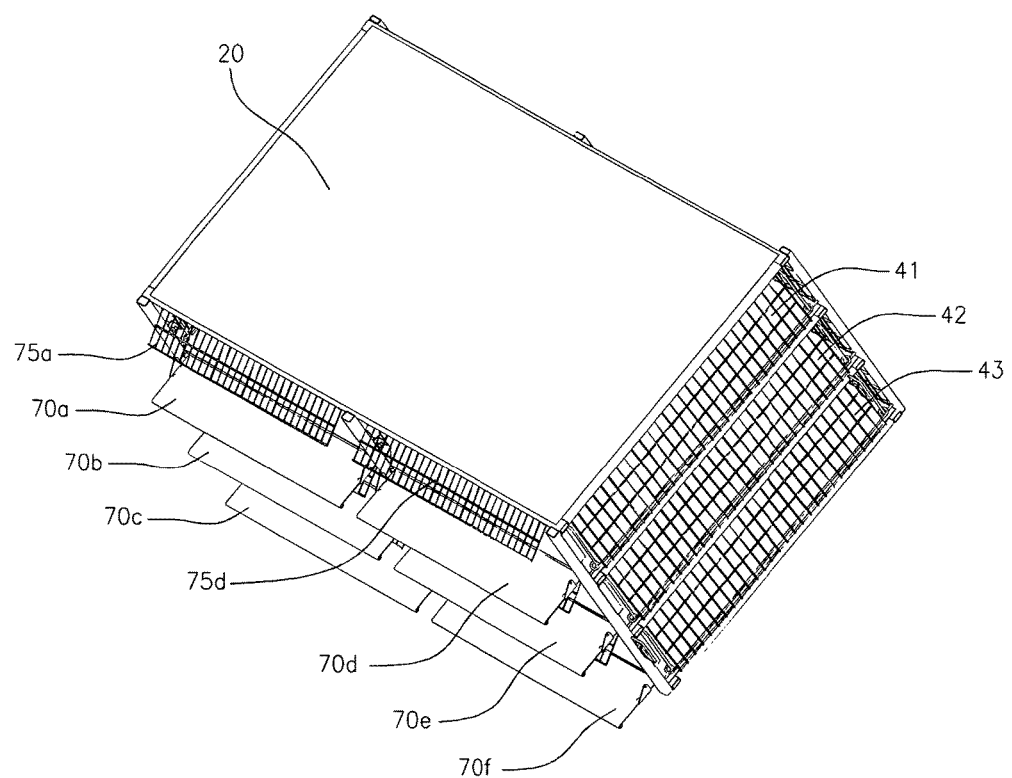
FIG. 7 is an isometric view of the cage structure of FIG. 1 shown in an unloading mode.

The operation of this preferred embodiment is illustrated in FIGS. 5-7. FIG. 5 shows the cage structure 10 of the preferred embodiment in the loading mode. The three entry doors 41, 42, and 43 on first end 40 have all been opened or removed so that poultry birds can be loaded into the three compartments that they enclose. After loading of the three compartments is accomplished, the three entry doors 41, 42, and 43 on the first end 40 will be closed or attached, and each will be securely latched. The three compartments on second end 45 have been loaded by opening or removing entry doors 46, 47, and 48. After loading is accomplished, those doors will also be closed or attached, and latched. Loading may occur simultaneously or sequentially on the two sides 40 and 45. If there is no central partition 60, then loading can be accomplished on one side only.

After loading of cage structure 10 has been completed, the loaded trailer of an over-the-road truck takes the birds to a poultry processing plant. This mode is shown in FIG. 6. In that figure, all entry doors are closed. Poultry within the six compartments of the cage structure 10 are contained securely. The six exit doors will not allow the poultry to escape from the cage structure because the spring-loaded doors are placed facing the front of the trailer (facing the direction of normal travel), so that road wind will not cause them to open. If the truck brakes suddenly, the doors of any cage are prevented from opening by the cage in front of it or, in the case of the most forward cage, by a front headache rack carried by the trailer. Even where the trailer supporting the cage structure is jostled in transit or where the trailer sits upon a roadway that is not level, the spring-loaded doors contain the poultry birds within their cage compartments. The spring-loaded doors 70 overlap and hold the non-spring-loaded doors 75 as is apparent in FIGS. 5 and 6.

At such time that the poultry are to be unloaded from the cage structure, the entire cage structure 10 is tilted to the side as shown in FIG. 7. Specifically, the cage structure is tilted such that the second side 35 is significantly higher than the first side 30. Tilting can be accomplished by any mechanical means. For example, the trailer on which it sits may have a tilting mechanism that holds the cage structure 10 and lifts the second side 35. Care is taken to ensure that the cage structure remains in place and does not slide off the tilting mechanism. Alternatively, the entire cage structure could be grasped and lifted and tilted with a common forklift. Alternatively, a line or lines could be attached to the top 20 or the second side 35 of the cage structure 10 and then lifted to tilt the cage structure. Persons of ordinary skill in this art will know of or be able to easily devise different ways of tilting the cage structure 10 in the manner needed.

FIG. 7 shows the cage structure 10 in a tilted position where the second side 35 is higher than the first side 30. FIG. 7 shows the cage as it would appear after the poultry birds that the cage contained have all exited the exit doors. Spring-loaded doors 70 are shown in FIG. 7 in a completely open position and each door 70 is biased in this open position by their individual over-center springs. The doors 70 will remain in this open position, even after the cage structure 10 is righted, because the springs bias the doors 70 open. The non-spring-loaded doors 75 are shown open in FIG. 7 and generally pointing downwards due to gravity. These doors will each freely swing with respect to the tilt of the cage structure due to gravity since they have no spring to bias them in any direction. When the cage structure 10 is righted, the non-spring-loaded doors 75 will naturally close due to gravity.

When the cage structure 10 is tilted, at a certain point in the tilting maneuver, the poultry birds within the cage will not be able to continue standing on the floor of their respective cage compartments. They will slide or be urged by the tilt of the cage structure toward the exit double-door and will press against it. When a sufficient number of the birds press against the double-door, the spring force of the over-center spring-loaded door 70 will be overcome and the spring-loaded door 70 of each compartment will open. No longer contained by the overlap of the spring-loaded door 70, each non-spring-loaded door 75 can easily open, and will in fact pivot on its hinge to open sufficiently to allow any bird in the door area to exit the cage compartment. The birds may simply fall out of the cage compartments, they may jump or fly out, or persons can reach in and pull them out easily since they will move to be near the door area. Whatever the manner of exit, the birds will all exit their respective cage compartments due to the tilting of the cage structure 10.

The over-center spring-loading of doors 70 is known per se. The spring-loaded doors 70 can be pushed open a certain extent and the springs will continue to urge the doors 70 closed. However, at a certain point (the center of the spring), the doors 70 will be urged fully open by the spring, and the spring will then resist the closing of the doors 70. Once the doors 70 are thereafter pushed back toward closing beyond a certain point (the center of the spring), the spring will urge the doors 70 to the fully closed position and will resist the door to be opened. Over-center springs and their function with doors are known per se in this art.

When all of the poultry birds have exited the cage structure 10 and the cage structure has been righted, the non-spring-loaded, doors 75 will naturally return to their closed positions due to gravity. A person or a machine can then close the spring-loaded doors 70 and they will again secure the non-spring-loaded doors 75 because the spring-loaded doors 70 slightly overlap the non-spring-loaded doors 75. The cage structure 10 is then ready to be returned to a location where it can again be loaded with poultry birds that are to be transported to the processing plant.

Figure 8:
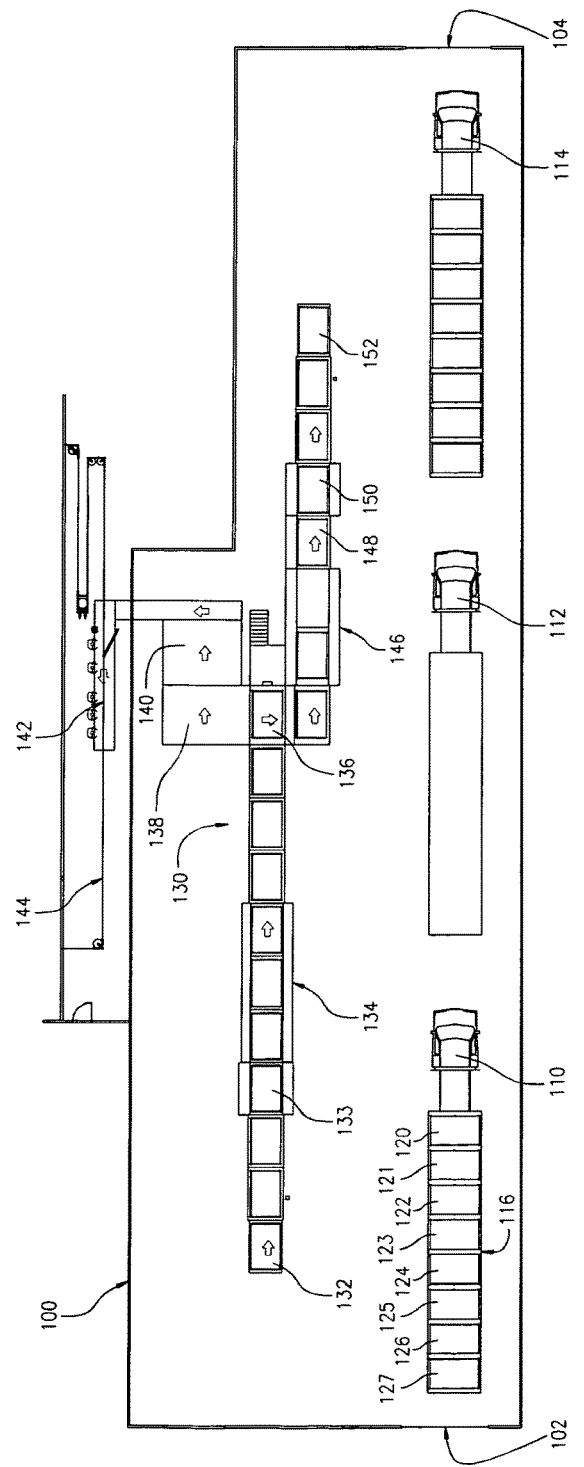
FIG. 8 is an overhead view of a system for utilizing cages made according to this invention.

FIG. 8 shows an overhead view of a preferred embodiment of how the birds will arrive at the processing plant, be removed from the compartments of the cages, and be placed on a conveyor system for processing within the plant. Also shown in FIG. 8 is how multiple cages will be placed on the trailers of an over-the-road truck.

A poultry bird processing facility can comprise an bird unloading structure 100 having doors 102 and 104 that are sized to allow over-the-road trucks with trailers to drive through the unloading structure 100. In FIG. 8, three over-the-road trucks 110, 112, and 114, each having trailers are shown within the unloading structure 100. Each truck 110, 112, and 114 pulls a trailer, and each of the trailers is capable of carrying multiple cages that enclose poultry birds. For example, truck 110 pulls its attached trailer 116 on which are disposed cages 120, 121, 122, 123, 124, 125, 126, and 127, all of which would normally contain poultry birds arriving at the plant for processing. Truck 112 has had all cages removed from its trailer and can be cleaned at this point. Truck 114 can have empty cages loaded on its trailer to return them to poultry farms to be filled again with poultry birds. The eight cages shown (120 to 127) could be stacked upon similar cages below each of the cages shown, or they may sit directly upon the trailer. The exact number of cages set upon a trailer will be a matter of design choice, but generally as many cages as can fit and be safely carried on a trailer will be the number that the truck operators desire to carry. As is apparent in FIG. 8, the trucks 110, 112, and 114 each have entered through door 102 and will eventually exit through door 104.

Each of the cages on each of the trailers can be made according to the invention described in this disclosure. The cages have been placed on the top of the trailers such that the spring-loaded doors (70a through 70f in FIG. 3) are oriented facing the front of the trailer, that is the direction of normal over-the-road travel. Because the first cage 120 (the one nearest the truck 110) is just a short distance from a headache rack (not shown) normally disposed on the front of a transport trailer, the spring-loaded doors 70a through 70f of the first cage, if opened for any reason during transport (as by hard braking of the truck) will open only slightly before striking the headache rack and opening no further. This prevents any birds within the first cage 120 from exiting the cage during transport.

Each of the seven cages 121-127 shown behind the first cage 120 is placed a short distance from the cage in front of it. If hard braking of the truck were to cause the spring-loaded door of any of these cages to begin to open, it would soon strike the back of the cage in front of it, thereby preventing it from opening more than a small amount, and preventing any birds within any cage from exiting the cage. The cages are not placed in such a manner that they abut one another, but are disposed just a short distance apart from one another.

In operation, as a truck and trailer arrive at the plant, the cages on the trailer can be individually taken off the trailer, or removed in stacked groups, and moved a short distance to the loading station 132, which is the start of a conveyor system 130 that is capable of moving multiple cages along the stunning and unloading system that will be described. The cages can be placed individually on the loading station 132 oriented such that doors 45 of each cage are toward the front (in the direction of travel of the conveyor system 130; to the right in FIG. 8), doors 40 of each cage are toward the back (opposite to the direction of travel of the conveyor system 130; to the left in FIG. 8), and the spring-loaded doors 70a through 70f of each cage are oriented away from the trucks they have just arrived on (toward the top in FIG. 8). The conveyor system 130 can move all cages on it simultaneously. From the loading station 132, the cages move in sequence to an unstacking station 133, where stacked cages are placed singly on the conveyor system 130, and then to a stunning chamber 134. The stunning chamber 134 can be arranged to stun only the birds in one cage at a time, or a batch of cages (three as shown in FIG. 8) can enter the stunning chamber 134 at a single time. As is well known in this art, a stunning gas can be rapidly introduced into the stunning chamber 134 to stun the birds within the cages therein, after which the cages will be moved by the conveyor system 130 out of the stunning chamber 134 to an unloading station 136. There can be a fan exhaust system at the stunning chamber 134 to remove the stunning gas from the stunning chamber before the chamber is opened.

At the unloading station 136, an operator will cause each cage to be tilted to the side on which doors 70a through 70f and 75a through 75f are located. This would be toward the top in FIG. 8. The unloading station 136 will use any of several known means for tilting a cage to one side. The weight of the stunned birds inside the cage compartments will naturally cause the birds to slide toward the doors 70a through 70f. The weight of the birds sliding into and pressing against doors 70a through 70f and 75a through 75f will then cause these doors to open, allowing the birds to exit the cage compartments and fall upon a receiving belt 138. When doors 70a through 70f are opened past the center of their over-center mechanism, the doors will each be biased by their over-center mechanism to fully open and then remain opened. The doors 75a through 75f will, of course, swing freely downwards by gravity. The receiving belt 138 will then move the birds to a transition belt 140 and then to a hanging place 142 where the birds can be lifted by humans to be hung by the legs on hooks suspended from another conveyor system 144. Or, because the birds are stunned, the humans at the hanging place 142 can simply put the birds' legs in the shackle without lifting the birds. From there, the birds will travel on conveyor system 144 to a place where they are prepared for human consumption.

After tilting the cage at the unloading station 136, and after all birds have exited the cage compartments, the operator will cause the cages to be rotated back to their normal upright orientation. When the cage has been righted, the doors 75a through 75f naturally swing to their normally closed position due to gravity. The doors 70a through 70f remain in the open position. Each cage then is moved by the conveyor system to a washer station 146, where each cage is washed.

After washing, each cage is moved to a closing station 148 where the doors 70a through 70f are closed, either manually by a person or mechanically by a closing mechanism (not shown). From that point, the cages can be moved to a stacking station 150, where cages can be stacked one upon another. The conveyor system 130 then moves the stacked cages to a loading station 152, where the individual or stacked cages are moved a short distance back to the trailer of the proper truck. The truck can then transport the empty cages back to another location to be filled with more live birds.

This description of one possible way of utilizing the cages of my invention is only one of many such ways. This description is not meant to limit the ways in which cages with my invention can be unloaded, but only to provide a preferred embodiment. Persons of ordinary skill in this art who read this disclosure may conceive other ways to utilize the cages of my invention and those ways would still come within the scope of my invention.

It is apparent that my novel exit door structure and the disposition of all exit doors on one side of the cage structure will enable operators to more quickly and more efficiently unload birds from the cages, while still securely containing them in the cages during transport. My novel cage arrangement provides separate entry and exit doors which is itself an improvement over the prior art. The provision of over-center spring-loading double doors is a novel way of automating the unloading process.

One of ordinary skill in this art, having read the disclosure above and viewed the accompanying drawings will be able to make certain modifications to my preferred embodiment using only common knowledge available in the prior art and ordinary skill. My invention can be applied to cage arrangements of one, two, or more columns of cage compartments, and to arrangements of one, two, or more levels of cage compartments, or any combination thereof. My invention can be applied to arrangements where separate cage compartments are disposed on both the first side 30 and the second side 35. My invention can be applied where it is desired to remove birds from both sides at different times as by tilting the cage structure in one direction and then the other. My preferred embodiment could be modified such that the entry doors are disposed along sides 30 and 35 and the exit doors disposed along, ends 40 and 45. Alternatively, both entry and exit doors could be disposed on the same side of the cage structure. Alternatively, the cage structure might utilize the exit doors for loading and unloading of the birds, and then not have separate entry doors. These modifications and the like all come within the scope of this disclosure and are encompassed by it.

One of ordinary skill in this art, having read the disclosure above and viewed the accompanying drawings will be able to design certain modifications of my over-center spring-loaded double door such that the modification accomplishes the purpose disclosed herein but in a somewhat different manner. For example, the spring-loaded door of the double-door system could be disposed at the top of the system rather than at the bottom as shown in my preferred embodiment, or two cooperating spring-loaded doors may be used together. Alternatively, my preferred embodiment might be modified such that two cooperating non-spring-loaded doors might be used. The double-door system might be modified such that the doors are hinged at the two sides of the compartment rather than along the top and bottom as I have disclosed. The amount of overlap between the two doors of the double-door system can be modified. The overlap might be accomplished by a relatively small extension piece rather than the entire door. The spring-loaded door might be spring-loaded, but without the over-center feature, although this would be of less utility as explained above. These modifications and the like all come within the scope of this disclosure and are encompassed by it.

My disclosure provides a preferred embodiment as is required in a patent application, but my invention is not limited by this preferred embodiment. It is merely one manner of using the concepts of my invention as disclosed above. Persons of ordinary skill in this art, after reading this application, will be able to devise different embodiments based on the inventive concepts disclosed by me, and these embodiments come within the scope of this disclosure.

I claim:

1. A method of transporting poultry birds from a place where they are grown to a place where they are slaughtered and dressed for consumption, the method comprising the steps of:
    a) providing a first door covering a first opening of a cage compartment, wherein the first door is spring-biased toward a closed position across the first opening of the cage;
    b) placing plural poultry birds into a second opening of a cage compartment;
    c) securely closing a second door over the second opening;
    d) transporting the cage compartment to another location; and
    e) tilting the cage in the direction of the first opening to a predetermined angle at which the poultry birds will slide toward the first opening of the cage compartment and the weight of the poultry birds will push the spring-biased first door beyond a bias point and into an open position wherein the spring biases the first door toward an open position, allowing the poultry birds to exit the cage compartment through the first opening.

2. The method of claim 1 further comprising the step of:
    f) closing the first door so that it again covers the first opening of the cage compartment and is spring-biased toward the closed position.

\* \* \* \* \*